(12) United States Patent
Fischer et al.

(10) Patent No.: US 8,819,085 B2
(45) Date of Patent: Aug. 26, 2014

(54) SYSTEMS AND PROCESSES FOR INTERACTIVE DATA COLLECTION AND ASSESSMENT

(75) Inventors: Brandon Fischer, Carmel, IN (US); Adam Cuzzort, Fishers, IN (US)

(73) Assignee: Triage, LLC, Indianapolis, IN (US)

( * ) Notice: Subject to any disclaimer, the term of this patent is extended or adjusted under 35 U.S.C. 154(b) by 66 days.

(21) Appl. No.: 12/765,710

(22) Filed: Apr. 22, 2010

(65) Prior Publication Data

US 2010/0325144 A1 Dec. 23, 2010

Related U.S. Application Data

(60) Provisional application No. 61/171,828, filed on Apr. 22, 2009.

(51) Int. Cl.
*G06F 17/30* (2006.01)
(52) U.S. Cl.
CPC ..................................... *G06F 17/30* (2013.01)
USPC ......................................... 707/805; 715/762

(58) Field of Classification Search
USPC ........................................... 707/805; 345/738
See application file for complete search history.

(56) References Cited

U.S. PATENT DOCUMENTS

| | | | |
|---|---|---|---|
| 7,739,122 B2 * | 6/2010 | Greenstein et al. | 705/1.1 |
| 8,005,690 B2 * | 8/2011 | Brown | 705/2 |
| 8,112,457 B2 * | 2/2012 | Berry et al. | 707/805 |
| 8,135,610 B1 * | 3/2012 | Bryce et al. | 705/7.41 |

* cited by examiner

*Primary Examiner* — Yicun Wu
(74) *Attorney, Agent, or Firm* — Ice Miller LLP

(57) ABSTRACT

Data collection and assessment systems and processes for delivering a personalized experience to a user by gathering information from the user through a dynamic interface, performing detailed analyses based on the data collected, identifying the most probable user-specific outcome(s), and providing relevant feedback and analyses based on the most probable user-specific outcome identified. Embodiments of the described system and process also comprehensively track and store user data, thereby enabling the highest levels of user status supervision, client relations and efficiency.

15 Claims, 15 Drawing Sheets

350

Henry Ford Health Systems Triage Administration v0.2a

Edit Module : Cardiac Risk Assessment

Edit Step : Physical Activity

Step Details | Step Responses — 1004

1002 Edit Response Form

| | |
|---|---|
| Response Name | Some Activity |
| Value Format | INT - Integer |
| Response Video | Modifiable Risk Factor: Physical Activity |

☑ Play response?

| | |
|---|---|
| Range (Start) | |
| Range (End) | |
| Reject Response | No |
| Response Text | Some Activity |
| Description | The video above will play if this response is selected |
| Conditions | |

1022

Log Out

SYSTEMS AND PROCESSES FOR INTERACTIVE DATA COLLECTION AND ASSESSMENT

PRIORITY

The present application claims priority to U.S. Provisional Patent Application Ser. No. 61/171,828, filed Apr. 22, 2009, the content of which is hereby incorporated by reference in its entirety into this disclosure.

BACKGROUND

Effective and organized data collection has long been an important component of businesses with respect to the development and management of successful client relations. Successful businesses are able to evaluate their clients individually, identify each individual client's needs, determine if there are any existing or potential problems that require attention, and intelligently interact with each client to optimize client relations. Additionally, effective client education relating to the services or products offered by a company and/or the need for such services is also a key component to business growth and maintaining client satisfaction. Each of these client-service objectives is heavily dependent upon having access to relevant information and storing such information in an easily accessible format.

Conventional data collection systems gather and store a broad array of client information, much of which may be irrelevant to a business' and/or a client's objectives. Such a broad approach to data collection and storage not only increases the risk that a client will become inundated with and disinterested in the data collection process, but also does not ensure that the appropriate information is collected. In addition, such broad data collection methods make it difficult to provide a client with educational materials that are relevant to that particular client's needs. Accordingly, there is a need for an automated system having a dynamic user interface that not only collects client information, but also is capable of identifying what additional content is needed based on a client's previous responses and thereafter pointedly tailors its inquiries on a real-time basis to ensure such information is collected. Moreover, it is desirable that the system can store the collected data in an intelligent format such that it is easily accessible and can link to different types of data from disparate locations and various formats in order to provide a comprehensive comparison and assessment of the collected data relative to other resources.

SUMMARY

Systems and processes for providing interactive data collection and assessment. Embodiments of the system described herein comprise at least one application comprising a core application logic and at least one module, a server network and at least one network accessible device. Each of the at least one modules defines two or more steps and at least one of the steps is configured to collect data from a user. Further, the core application logic is adapted to evaluate the collected data, derive one or more result values therefrom, and execute the steps of each module in a customized sequence pursuant to the one or more result values. The server network of the system is adapted to execute the at least one application and comprises at least one database accessible by the at least one application. The at least one network accessible device of the system is adapted to interface with the server network and configured to display one or more graphic user interfaces associated with the at least one module of the application. In at least one embodiment, the at least one graphic user interface may comprise an audio and video component. For example and without limitation, the first step of the module may comprise an audio and video component comprising a first content, a second step of the module may comprise an audio and video component comprising a second content, and the core application logic may be adapted to select between executing the first step and the second step based on the result value.

In at least one embodiment, the at least one application of the system is adapted to store the collected data in one or more of the at least one databases of the server network. Here, at least one of the modules of the at least one application may comprise an assessment module adapted to access the collected data stored in a database, evaluate the collected data using a test to derive the result value, and determine the customized sequence of the steps of the assessment module based on the result value. For example, the test may comprise a conditional statement logic or a formula. In at least one embodiment, the assessment module may comprise a risk assessment module for use in a medical field and the collected data may comprise health-related parameters. Additionally or alternatively, at least one of the modules of the system may be adapted to receive an inquiry from the user, categorize the inquiry according to pre-defined variables, and assign the inquiry to a resource associated with the identified category.

The steps of the module may be selected from the group consisting of a data collection-type step, an informative-type step, a calculation-type step, and a combination data collection-type and informative-type step. Further, at least one of the modules may comprise a decision logic. Additionally or alternatively, one or more of the databases of the server network may comprise an external database. Here, the database may comprise a knowledge base comprising data benchmarks. In this at least one embodiment, the application is adapted to evaluate the collected data against the data benchmarks of the knowledge base and present the result value to the user through the graphic user interface.

In at least one embodiment, one or more of the applications of the system comprises a custom business logic application adapted to analyze the collected data, interface with and retrieve third-party data related to the collected data from a third-party application or a third-party database, and integrate the third-party data into one or more steps of a module of the application. For example and without limitation, the third-party data may comprise an advertisement and at least one of the two or more steps of the module displays the advertisement to the user through the graphic user interface.

Processes for data collection and assessment are also described herein. At least one embodiment of a process for data collection and assessment comprises the steps of: providing a data collection and assessment system comprising at least one module having a plurality of steps; requesting a first response value from a user through a first step of the module; receiving the first response value; evaluating the first response value using a first test to derive a first result value; advancing to a second step of the module, the second step comprising a first content based on the first result value; requesting a second response value from the user through the second step of the module; receiving the second response value; evaluating the second response value using a second test to derive a second result value; and advancing to a third step of the module, the third step comprising a second content based on the first result value, the second result value, or both. In at least one additional embodiment, the process may further comprise the step of assessing if the first input value is a user metric and, if so, storing the user metric in one or more databases associated with a record of the user.

The second step of the module may comprise an audio and video component having a first content. Further, the first and second tests of the process may be selected from the group consisting of a formula, a conditional statement, and a range comparison of benchmark data values. Additionally, in at least one embodiment, the step of evaluating the second response value using a second test to derive a second result value further comprises evaluating if the second result value is true, if so, advancing to the third step of the module, and, if not, advancing to a fourth step of the module, the fourth step having a third content based on the second result value. Optionally, the process described herein may further comprise the steps of: interfacing with a third-party business logic application; identifying content of a third-party business logic application based on the first result value; and displaying the content of the third-party business logic application in connection with the second step of the module.

DESCRIPTION OF THE FIGURES

FIGS. 10A and 10B show examples of an administrative interface to facilitate the process of FIG. 9.

DETAILED DESCRIPTION

Figure 1:
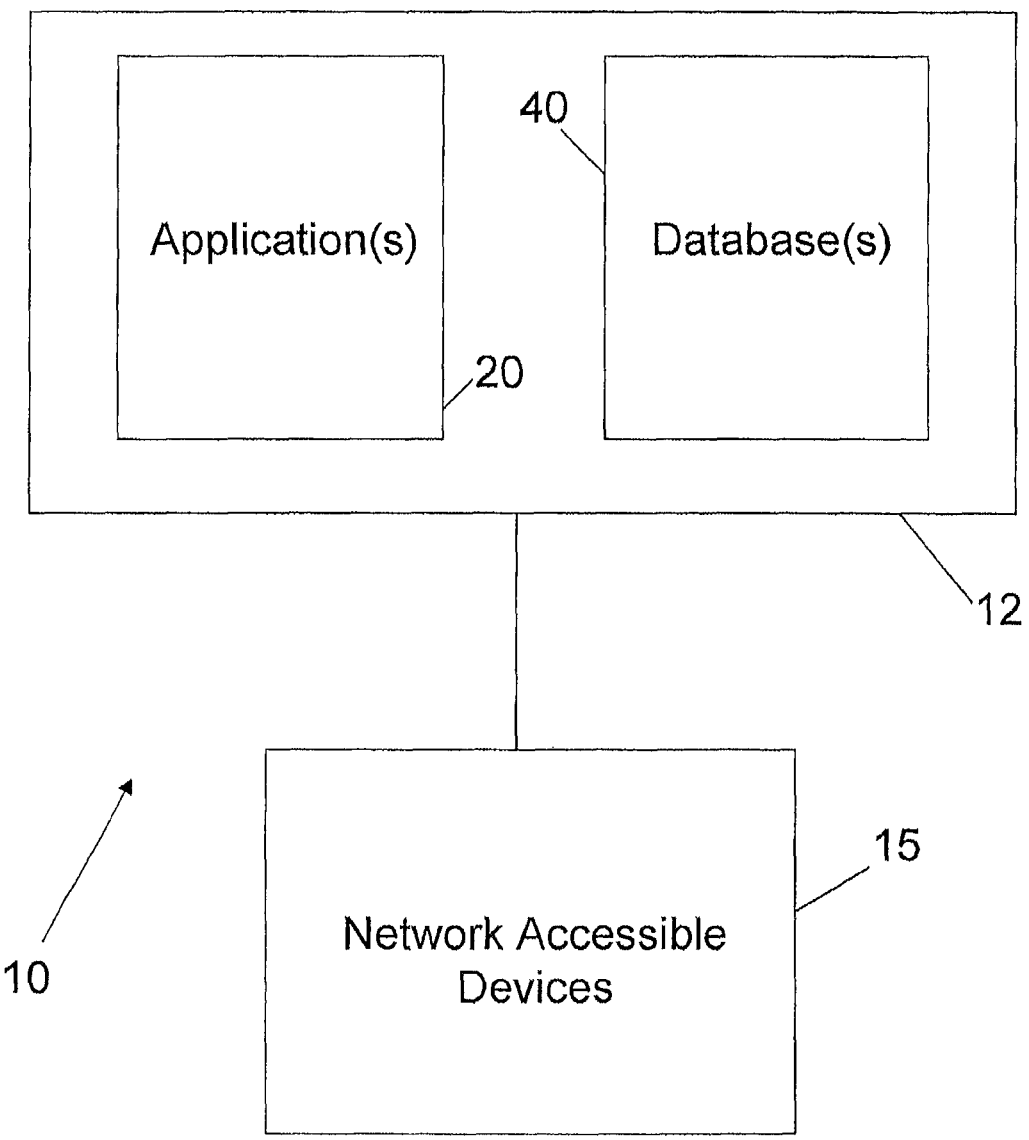
FIG. 1 shows a schematic view of at least one embodiment of a data collection and assessment system.

Reference will now be made to the embodiments illustrated in the drawings and specific language will be used to describe the same. It will nevertheless be understood that no limitation of scope is intended by the description of these embodiments.

FIG. 1 shows a schematic view of at least one embodiment of a data collection and assessment system 10. The data collection and assessment system 10 is an expert system that is capable of delivering a personalized experience to a user by gathering information from a user through a dynamic interface, performing detailed analyses based on the data collected and providing relevant feedback and analyses based on the most probable user-specific outcome. In addition, the data collection and assessment system 10 comprehensively tracks and stores user data, thereby enabling the highest levels of user status supervision, client relations and efficiency.

For example, in at least one embodiment, the data collection and assessment system 10 may be used in the health care field to collect measured health parameters and lifestyle-related data from patients, identify applicable risk factors associated with that particular patient based on the data collected, and provide information to the patient on the specific conditions associated with the identified risk factors. Furthermore, in this at least one embodiment, the data collection and assessment system 10 can also provide the patient with contact information for health care specialists in the medical field(s) that treat the conditions associated with the patient's identified risk factors. While specific embodiments of the data collection and assessment system 10 described herein may pertain to the use of the data collection and assessment system 10 in the health care area, it will be appreciated that the application of the data collection and customized assessment system 10 is not so limited and may be applied to any industry where the dynamic collection and assessment of end-user data may be beneficial.

Now referring to FIG. 1, the data collection and assessment system 10 comprises a server network 12 that may include a plurality of central computer servers. The server network 12 is operatively coupled with a plurality of network accessible devices 15 and is capable of executing one or more applications 20. The network accessible devices 15 may comprise portable or handheld computing or communications devices having network interfaces (wireless or otherwise), such as personal data assistants ("PDA"), mobile telephones with PDA functionality, notebook or tablet personal computers, standard desk top computers, or any other computing or data entry devices.

In at least one embodiment, the server network 12 of the data collection and assessment system 10 is operatively coupled with the plurality of network accessible devices 15 over a networking infrastructure. For example and without limitation, the server network 12 of the data collection and assessment system 10 may be operatively coupled with end-user computer terminals via the Internet, intranet or other connection. In this at least one embodiment, the data collection and assessment system 10 may use a virtual private network to communicate data over the networking infrastructure such that a user can communicate with the data collection and assessment system 10 over a secure and encrypted connection. Alternatively, the server network 12 may be operatively coupled and accessible to the plurality of network accessible devices 15 and applications through a server-centric computing component.

As shown in FIG. 1, the server network 12 of the data collection and assessment system 10 comprises one or more applications 20 and at least one database 40. In at least one embodiment, the server network 12, each of the applications 20 and each of the databases 40 are linked together via Transmission Control Protocol and Internet Protocol (TCP/IP). It will be appreciated that other embodiments of the data collection and assessment system 10 can utilize other means to link the application(s) 20 and database(s) 40 of the system 10 together. For example and without limitation, the data collection and assessment system 10 may call web services to interact with an application 20 and a database 40. Alternatively, the at least one application 20 and/or database(s) may be stored on non-volatile storage (e.g., hard disk) associated with the server network 12. Accordingly, the server network 12, the application(s) 20, and the database(s) 40 are all capable of communicating with each component of the data collection and assessment system 10.

The one or more applications 20 of the data collection and assessment system 10 are any software packages that are able to integrate the components of the data collection and assessment system 10 and capable of communicating with the one or more databases 40. In at least one embodiment, at least one of the applications 20 comprises one or more modules 30. Additionally, one or more of the applications 20 may comprise a core application logic 35 capable of handling any decision logic associated with the one or more modules 30. Further, one or more of the applications 20 may comprise a third-party application. It will be appreciated that any type of third-party application may be selected for use in connection with the data collection and assessment system 10, the type of which may be dependent upon the desired application(s) of the system 10 as a whole. The applications 20 may be individually loaded onto separate servers within the server network 12, or the applications 20 may be loaded onto a single server. Embodiments of the applications will be discussed in further detail below.

The one or more databases 40 of the data collection and assessment system 10 are for data storage and for interfacing with the network accessible devices 15 via the one or more applications 20. For example, the databases 40 are capable of storing response values entered into the data collection and assessment system 10 by a user via a network accessible device 15. Furthermore, the databases 40 are also capable of making such stored data available to the applications 20 such that the applications 20 can process the same. Optionally, each of the at least one databases 40 of the data collection and assessment system 10 may store one or more knowledge bases 50 that define predetermined benchmarks and/or identify follow-up queries related to specific data values that may be collected from a user by the system 10 via the network accessible devices 15.

Each database 40 comprises any database commonly known in the art that is capable of being accessed by the one or more applications 20. The databases 40 may further comprise a plurality of individual, unrelated databases and some or all of the databases 40 may be associated with specific applications 20. In addition, one or more of the databases 40 may be remotely located with respect to the data collection and assessment system 10 provided that the server network 12 and the applications 20 are capable of accessing the remote databases 40 over a connection. In at least one embodiment, these remote databases 40 may comprise an external data source from where the network server 12 may pull external data values for use in connection with the data collection and assessment system 10. Many types of connections for enabling the data collection and assessment system 10 to access such an external data sources are well known in the art.

Figure 2:
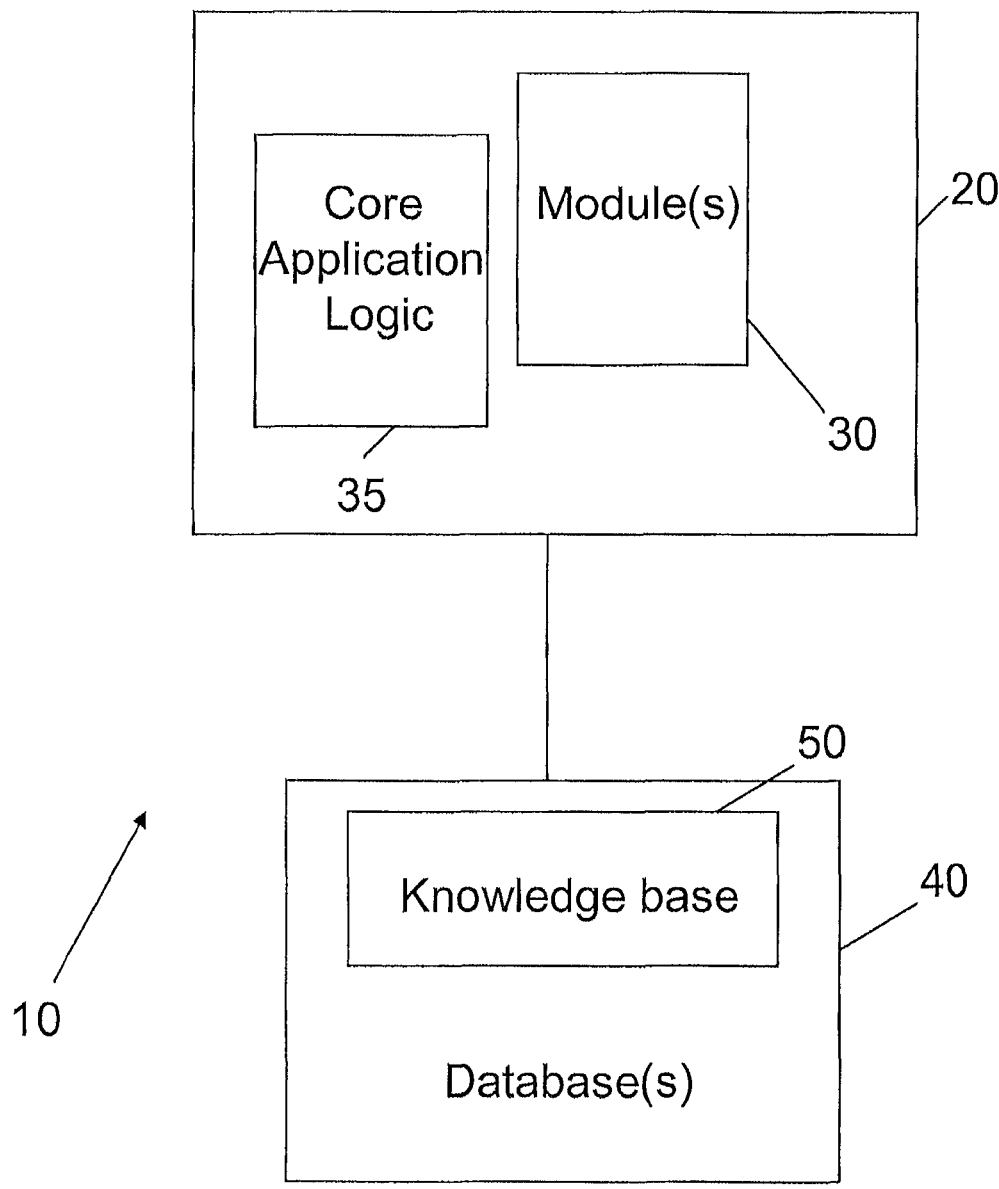
FIG. 2 shows a schematic view of the data collection and assessment system of FIG. 1.

Now referring to FIG. 2, the data collection and assessment system 10 is shown with an example of an application 20 that can be included therewith. Each of the at least one applications 20 of the data collection and assessment system 10 may comprise and/or be capable of creating one or more modules 30. Each module 30 comprises at least one step that can be executed in a systematic fashion based, at least in part, on conditional statements and the assessment of user-metric values collected from a user of the data collection and assessment system 10. As used herein, a "user-metric" is a type of response value that has been identified through the module 30 as needing to be stored within a user's account in the system 10 (as will be described in more detail herein).

Figure 3A:
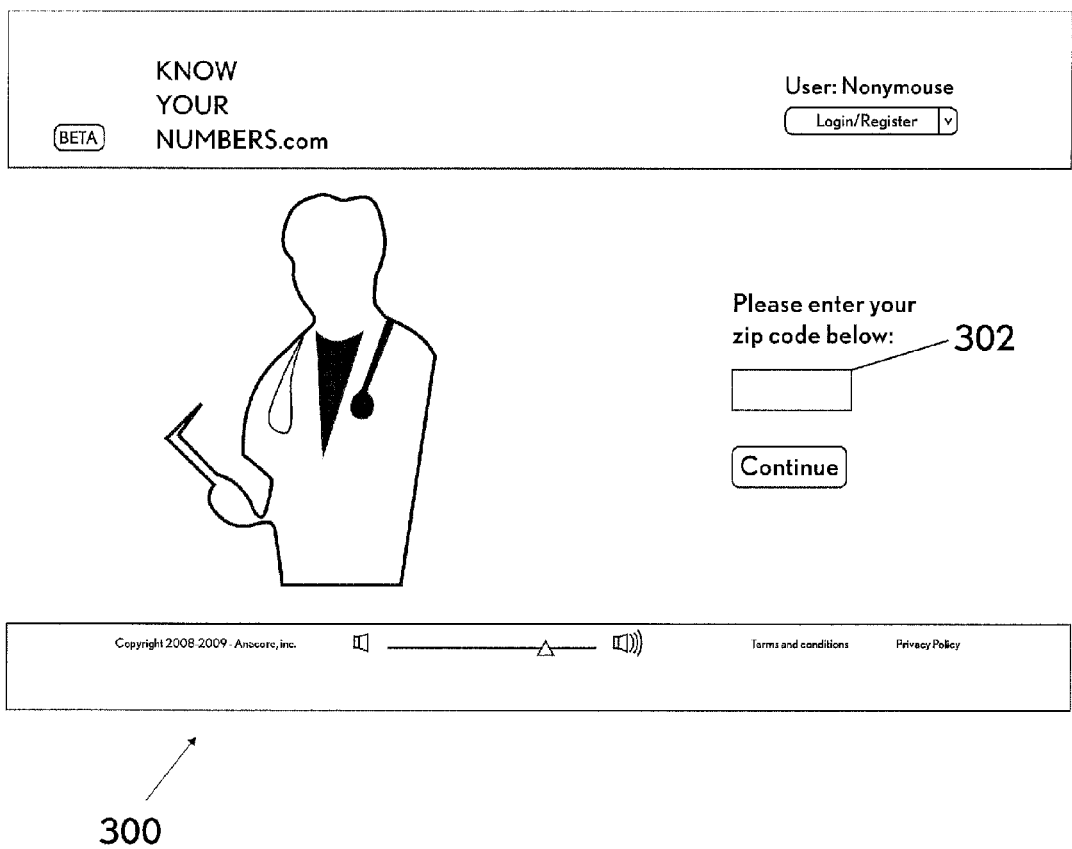
FIG. 3A shows one example of a data collection-type step.
Figure 3B:
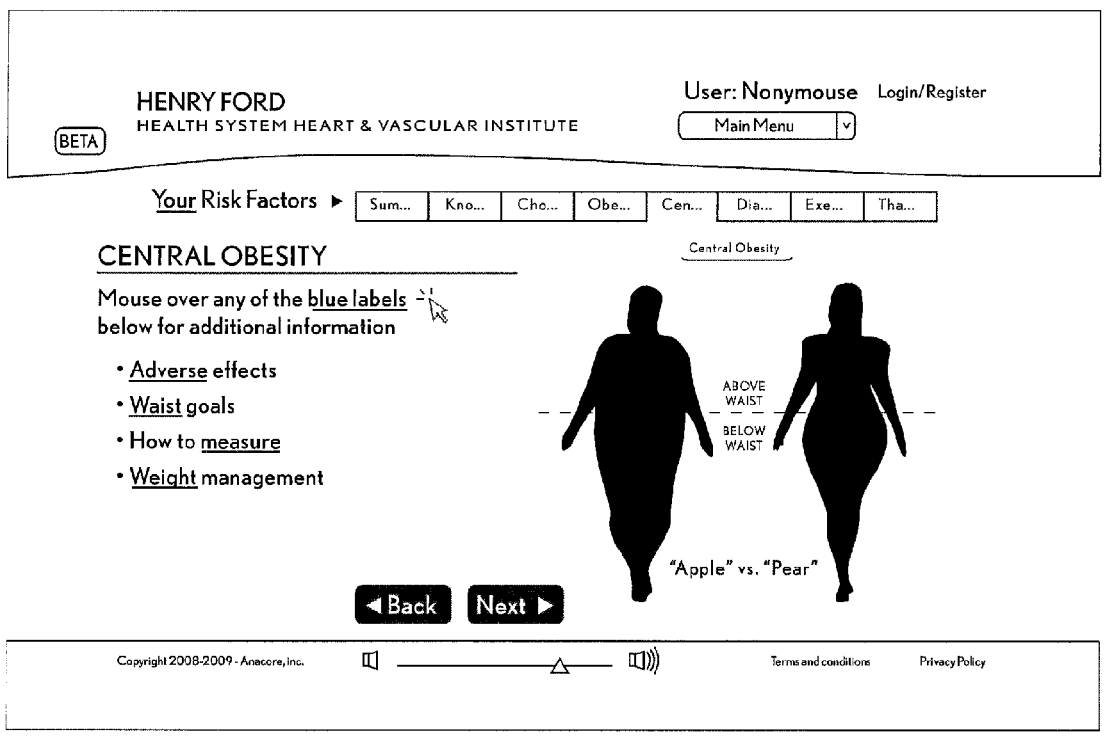
FIG. 3B shows one example of an informative-type step.
Figure 3C:
FIG. 3C shows one example of a combination-type step.

The steps of a module 30 need not be identical in format and may comprise various types. For example, the steps may include a data collection-type step, an informative-type step, and/or a combination data collection and informative-type step. While a step comprising a data collection-type step enables a user to input data into the data collection and assessment system 10 through the use of an input field (e.g., a drop-down menu, an activation button, a radio button, text slider, a text field, custom graphical control such as a clickable map, etc.) in response to an inquiry, an informative-type step simply provides the user with information, such as assessment results and/or educational resources or information. Likewise, combination-type steps include both the provision of information as well as an input field to receive user data. Embodiments of graphic user interfaces ("GUIs") illustrative of the different types of steps of a module 30 are shown in FIGS. 3A-3C. Specifically, FIG. 3A shows an end-user, front end GUI 300 comprising a data collection-type step. Accordingly, in this embodiment, the GUI 300 comprises one input field 302 where the user can provide a value (i.e. text field where the user is to enter his or her zip code). FIG. 3B illustrates an end-user, front end GUI 350 comprising an informative-type step. Note that in the GUI 350 of FIG. 3B the associated step of the module 30 does not request a response from the user and, instead, only provides information relative to central obesity. Further, FIG. 3C shows an end-user, front end GUI 375 comprising a combination-type step wherein a user response may be provided by setting the input field 382 to the desired value and subsequently clicking the activation button 384 to submit the response value. In addition, information 386 relevant to the user response request is also provided in GUI 375, thereby assisting a user to understand the request and increasing the chances of obtaining an accurate response value.

An additional type of step may also be a calculation-type step. Calculation-type steps can be used within a module 30 to compute a result based on one or more response values entered by the user. It will be appreciated that any type and/or number of formula(e) may be associated with a calculation-type step. For example, in at least one embodiment, a calculation-type step may be associated with a formula for calculating the user's body mass index (BMI=weight (kg)/height$^2$ (m$^2$)), where the relevant user-metrics are the user's weight and the user's height. Additionally, the calculation-type step may be associated with a formula for calculating a user's Framingham Risk Score, which involves converting response values of specific user-metrics into a point value and thereafter finding the sum of the resultant point values. Alternatively, in a financial-based module 30, a calculation-type step may be associated with a formula, such as a formula for calculating a project's net present value ($R_t/(1+i)^t$), where the one or more user-metrics to be inserted are the time of cash flow, the discount rate, and the net cash flow at a particular time. Another example of a formula that may be used in a financial-based model is one for determining a user's risk averseness and/or a user's tolerance for losing money in the short term in favor of long term gains. It will be appreciated that any type of formula(e) may be associated with a calculation-type step of a module 30 and that the type of formula(e) used may differ based on the desired application of the specific module 30.

When a calculation-type step is triggered within a module's 30 sequence, the relevant user-metrics are inserted into the formula(e) associated with that step of the module 30. Thereafter, each of the formulae are executed and the resulting value (or result) is saved to the server 12 as a new user-metric (the "result user-metric"). In at least one embodiment of the data collection and assessment system 10, the calculation-type steps of the module 30 occur in sequence behind the scenes such that the computations are invisible to the user. Accordingly, depending on the sequence of the module 30, the value of the result user-metric may be displayed to the user in the next step of the module 30, simply stored for future use within the system 10, and/or used in another calculation-type step of the module 30.

The format and details associated with each of the steps of a module 30 may be configured by an administrator of the data collection and assessment system 10 (as described in more detail below) in order to create a customized experience for the end user. For example and without limitation, an administrator can specify the number and sequence of steps in a module 30, the type of each step in a module 30, the type of data targeted in a data collection step, specific formula(e) to be associated with any calculation-type steps included in the module 30, which values (i.e. user-metrics) will be recorded for each response in a particular module 30, the bases upon which assessment of collected user data is to be performed, the available responses to each step, etc.

One or more of the steps of a module 30 may be subject to a conditional statement which is used to identify the conditions under which that particular step will be displayed to the user during the runtime of the module 30. As referred to herein, a "conditional statement" comprises a logical combinatorial system of computer logic elements that is capable of performing certain computations or actions based on the user-metrics entered up to and including that step and using any one or more or all of such user-metrics alone or in combination with external data values. For example, the conditional statement may be defined in a step of the module 30 through the use of an algorithm. In at least one embodiment, the conditional statement may comprise a Boolean statement. Further, a non-limiting example of a conditional statement that may be associated with a step of the module 30 is as follows: "If the user's age is less than 18, then the user is prompted with a custom step that informs them that they are too young to participate in the rest of the module." (Example syntax of said conditional statement: (|age|<18)).

As with the other formatting and substantive details associated with the steps of a module 30, the administrator of the system 10 may also define which steps are subject to a conditional statement and the specific limitations associated therewith. The effect of the inclusion of conditional statements within the steps of a module 30 is that when the module 30 is in operation, upon reaching a step subject to a conditional statement the assessment module 30 dynamically accesses the values of identified user-metrics provided in the previous completed step(s) and thereafter evaluates the conditional statement logic in order to determine whether or not to display the next subsequent step to the user. In this manner, the conditional statements of a module 30 facilitate the provision of an interactive experience to the user and ensure that the user is provided only with feedback and/or information that is relevant.

Each of the modules 30 of the one or more applications 20 may be capable of interfacing with at least one of the databases 40 of the data collection and assessment system 10 and storing data therein in an organized fashion. Furthermore, in the embodiment of the system 10 wherein at least one of the databases 40 comprises at least one knowledge base 50 and/or external databases, each of the modules 30 of the system 10 may be capable of interfacing with the knowledge base 50 and/or an external database (such as, for example, a hospital database of patient records or database of vehicle service history categorized by vehicle identification number). Accordingly, in this at least one embodiment, the knowledge base 50 and/or external data values retrieved from the external database may facilitate and direct the data assessment capabilities of each step of the module 30 and/or assist in defining one or more conditional statements associated therewith. For example, a conditional statement of a step of a module 30 may require the module 30 to query a particular knowledge base 50 stored within one of the databases 40 based on the user-metric values collected. In this manner, the module 30 can evaluate the collected user-metric values against benchmarks that have been established for each user-metric and readily identify whether or not the collected value(s) fall within an acceptable range.

In at least one embodiment, a specific module 30 may further comprise its own database (the "module database"). Here, the module database may be integrated with that particular module 30, or the module database may be independent thereof and accessible by the module 30 over a secure connection or as is otherwise known in the art.

Figure 4:
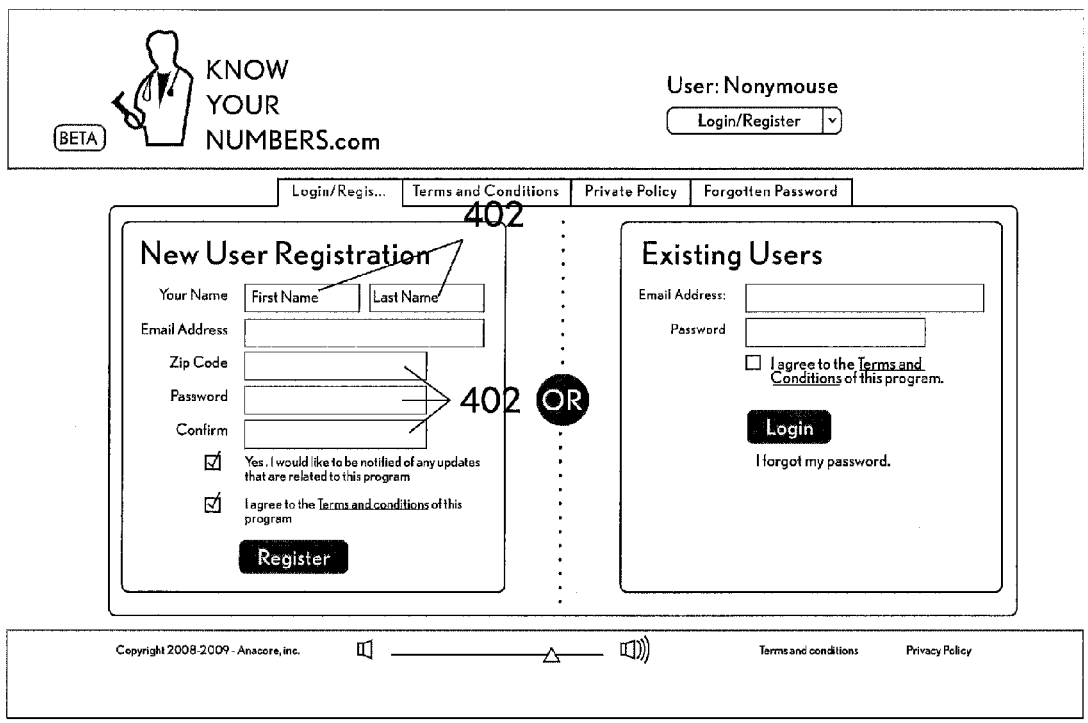
FIG. 4 shows at least one embodiment of a registration module.

A module 30 may interface with a database 40 and/or the module database and store the user-metric data collected from a user therein. In at least one embodiment of the data collection and assessment system 10, each user can register with the system 10 and create a user account. This can be achieved through the use of a module 30 devoted to user registration and login, or as otherwise is known in the art. Now referring to FIG. 4, at least one example of a front-end GUI 400 associated with such a module 30 is shown. In this at least one embodiment, a variety of input fields 402 are provided such that a user can enter the requisite registration data and submit it for storage in the system 10. When a user creates a registration account with the data collection and assessment system 10, any user-metric values collected from the user via a module 30 may be stored in the database 40 under the user's account records. In this manner, the user-metric data collected from a particular user may be accessed at a later time by the user, the system 10 and/or the administrator of the system 10.

The saved user-metrics may be shared between survey modules such that once a user has entered a value in response to an inquiry, that response value can be re-used in other modules. For example and without limitation, if a user enters his or her weight in response to an inquiry posed by the module 30, and "user weight" has been identified as a user-metric, the value entered will be saved to the user's account and may be accessed by other modules that require that particular user-metric.

In the at least one embodiment, one of the modules 30 of the application 20 of the data collection and assessment system 10 comprises a risk assessment module 100 configured to assess a user's risk for an adverse health event. Accordingly, a physician, hospital, or health care clinic may utilize the data collection and assessment system 10 having the risk assessment module 100 to pre-screen potential patients, identify such individuals' risk factors, provide relevant information to individuals with respect to the most probable adverse health events associated with each of their specific conditions, and supply those individuals who exhibit a high risk value for a particular adverse health event with the contact information of a health care specialist in the relevant area who practices in close geographical proximity to where that particular individual resides.

The risk assessment module 100 comprises an interface through which the system 10 can dynamically collect data (i.e. user-metrics) from a user relevant to the determination of health assessment factors. In this at least one embodiment, the risk assessment module 100 collects demographic information, measured health parameters and other lifestyle information from a user. Based on the values of the user-metrics collected, the risk assessment module 100 assigns a risk status that represents the total health risk to the user through the use of one or more calculation-type steps. For example, the higher the risk status level, the more likely that a user may be experiencing, or may be about to experience, an adverse health event. In this at least one example, the module 30 may comprise one or more calculation-type steps comprising formulae that compare the received values of each user-metric with a predetermined range of values associated with the user-metric that are considered to define normal or acceptable values for a patient in reasonable health. Such predetermined ranges can be entered into the module 30 details by an administrator and/or the relevant step(s) of the module 30 may direct the server 12 to access a database 50 to obtain the same.

Due to the ability of the risk assessment module 100 to dynamically collect and analyze data through the use of conditional statements, the steps of the risk assessment module 100 presented to the user are specifically selected such that the most relevant health and lifestyle information is obtained from the user. This can be achieved by assessing the user-metrics collected from the user during the data collection-type or combination-type steps of the module 100 and thereafter presenting specific inquiries and/or educational information that are deemed applicable based on the relevant conditional statements. Furthermore, in this at least one embodiment, through use of the calculation-type steps, conditional statements and/or optionally the knowledge base 50, the risk assessment module 100 can ultimately provide a user with a customized health assessment identifying the most probable adverse health event for that user.

Figure 11:
FIG. 11 shows at least one example of a graphic user interface for displaying a customized advertisement in connection with an informative-type step of a module.

To further customize a user's experience with the data collection and assessment system 10, one or more of the applications 20 may comprise a custom business logic application. In at least one embodiment of the system 10, integration of the custom business logic application may be triggered based on defined rules according to user input (i.e. response values). For instance, if a user responds in a desired manner to a particular inquiry or line of inquiries presented by the steps of the module 30, the custom business logic application can be integrated with an application comprising a third-party application or a database 50. In at least one example, a module 30 may be configured such that when a user inputs a value for his or her e-mail address and date of birth, the custom business logic application interfaces with and provides the input values entered by the user to one of the administrator's third party applications in order to access a desired piece of data (e.g., the user's unique identification code that is stored within the third party application). In at least one alternative example, a module 30 may be configured such that when a user inputs a response value (or response values) indicating that he or she suffers from high blood pressure (which may be determined through conditional statements associated with steps of the module 30 and/or through the use of calculation-type step(s)), the custom business logic application interfaces with one of the administrator's third party applications and/or one or more of the databases 50, and an advertisement for a medication for treating high blood pressure is displayed in connection with the GUI associated with that step of the module 30 (see FIG. 11). In this manner, the custom business logic application can enable the data collection and assessment system 10 to take custom action and/or display customized advertisements based on a user's entered response value.

The use of a custom business logic application to the system 10 allows for real-time processing, the inclusion of administrator-specific business rules, and full integration with any existing applications the administrator may operate independently of the data collection and assessment system 10. In at least one embodiment, the overall functionality of the custom business logic application may be controlled via a modular system having a distinct dynamic link library ("DLL"). The DLL may be integrated with the core application logic of the server network 12 such that the DLL may be modified independently at any time. In this manner, the data collection and assessment system 10 allows for greater flexibility of custom integration without disturbing the core functionality of the system 10.

In addition to the risk assessment module 100 described above, the data collection and assessment system 10 may comprise various other embodiments of the modules 30. Various other examples of the modules 30 may include a registration module configured to allow a user to create an account with the system 10 as already mentioned herein, a help module configured to provide live assistance and/or applicable specialist information to a user, and/or a results module configured to allow a user to access his or her personal results compiled by the module(s) 30 of the data collection and assessment system 10. While specific examples of modules 30 have been described herein, it will be appreciated that the modules 30 may be configured in any format and directed to any use.

In addition to the embodiments previously described, one of the applications 20 of the data collection and assessment system 10 may enable users to ask a question after they have completed a module 30 of the system 10 or at any other time. Questions submitted by the users are considered "leads" which are thereafter assigned by the system 10 to a professional based on numerous variables that may be defined by the system administrator (e.g., geographical proximity, question type, professional specialty, professional experience, professional rating, etc.). For example, in at least one embodiment, if a user is seeking information and submits a query to the server network 12 regarding a risk status he or she received after completing the risk assessment module 100, the system 10 can identify the nature of the inquiry and submit the same to a health care provider practicing in the user's geographical area and who specializes in the appropriate medical field.

Leads may be submitted to the professional through the data collection and assessment system 10 by associating the lead with the professional's user account on the system 10. Registered and/or approved professionals can login to their user account on the system 10 through a secure interface, retrieve leads that have been assigned to them, and respond to the same. The application 20 may further comprise a feature wherein if a professional has not responded to a lead within a specified timeframe (e.g., 24 hours), that professional's rating is lowered and the lead is passed to a higher-rated professional who is more responsive.

A professional may respond to a lead through the system 10 by typing a response or using a Web Camera. In addition, the professional can convey links to the inquiring user that provide additional resources regarding their inquiry. Such professional responses can be tagged as "private" or "public" by the professional prior to submission of the same to the system 10. In this manner, responses tagged as "private" will be kept confidential and only disseminated to the particular user who submitted the lead. Alternatively, "public" responses may be flagged for review by a system administrator and, if deemed appropriate, inserted into an organized, public knowledge base 50. In at least one embodiment, the professional who submitted the "public" response may be credited alongside their submitted response(s) in the public knowledge base 50.

The knowledge base 50 of the system 10 may further comprise a directory of the various professionals having user accounts thereon. This directory can be organized in any manner and, in one embodiment, is organized in various levels. For example, in at least one embodiment, the Level 1 organization may be by professional field (i.e. medical, legal, financial, insurance, reality, etc.), the Level 2 organization may be by specialty (i.e. practice area, etc.), and the Level 3 organization may be by the professional's individual rating assigned by the system 10.

After a professional responds to a user lead, the user receives an alert—either through e-mail, automated voicemail message or otherwise—that they have received a response to their question. In the event the alert is electronic, the alert may include a secure link to a secure server 12 associated with the data collection and assessment system 10. Accordingly, the user may either click the link or logon to their user account on the network server 12 as is known in the art. Upon logging into their user account, the user can view the professional's response to their inquiry. However, in at least one embodiment, before the response is displayed, the user is asked to agree to certain terms and conditions (which may be drafted and/or approved by an administrator). In the event the user agrees to such terms and conditions (or if no such terms and conditions are displayed), the user may view the responding professional's profile and the submitted response. In addition, variable actions that the user can take may also be displayed (e.g., "Save Professional," "Schedule Meeting/Appointment," and/or "Directions to Office," etc.). Such variable actions may be established by the responding professional or by the administrator.

This embodiment of the application 20 may also enable a user to rate the response received from the professional. For example, a user may rate a professional based on the response received on a scale of 1-5 and, optionally, save the professional's information to their user account. In the event the user saves the professional's information to their user account, the application 20 may be configured such that the user is also added to the professional's user account under a contact list record. In the event the user adds the professional's information to their user account, the user's contact information may optionally be shared with the professional through the network server 12 based on the settings of the system 10 and/or user accounts.

Figure 5:
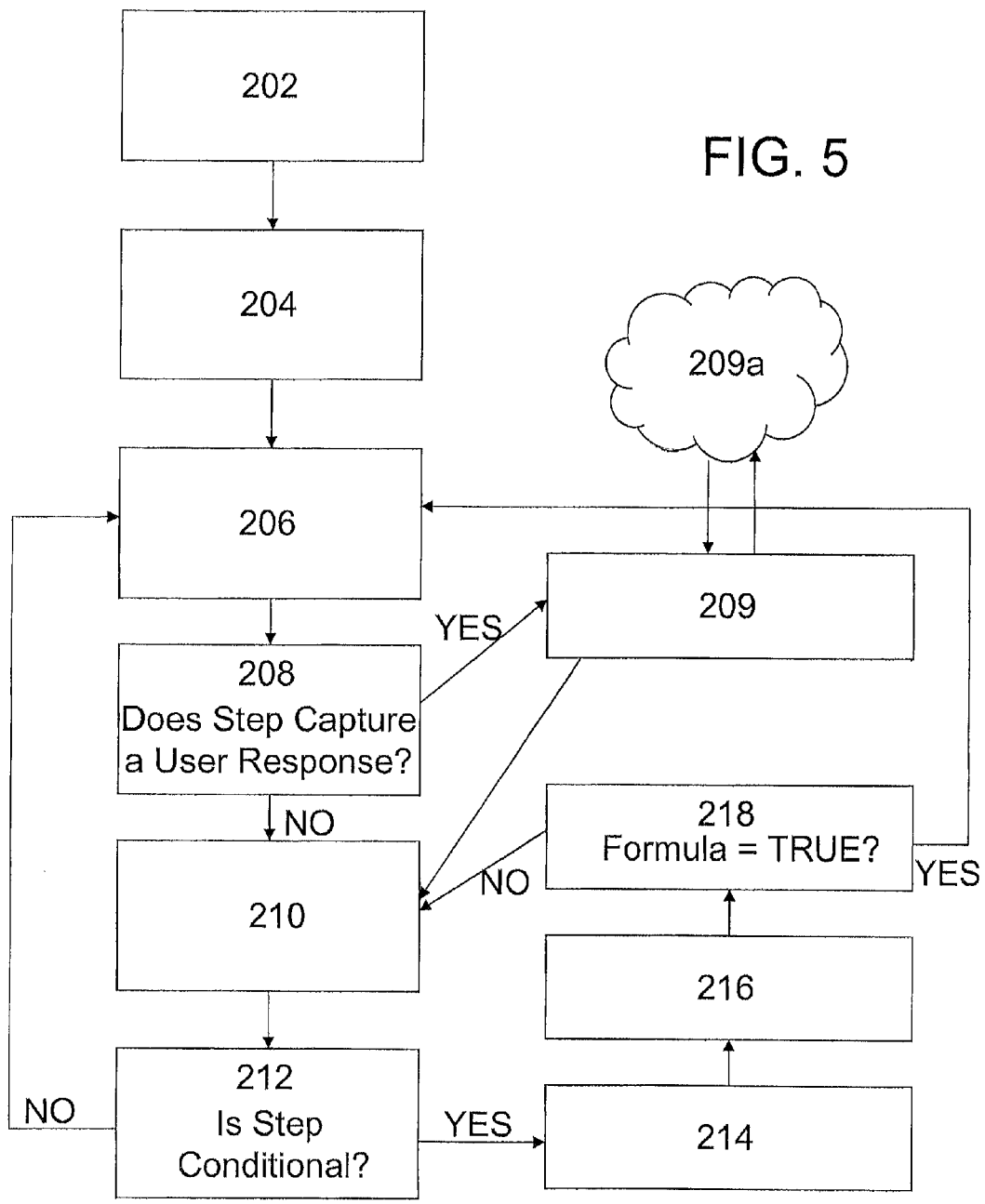
FIG. 5 shows a flow chart of one example of a data collection and assessment process.

Now referring to FIG. 5, a flow chart of a data collection and assessment process 200 is shown. The data collection and assessment process 200 may be followed by a user to access the functionality of the data collection and assessment system 10. For ease of understanding, the steps of the data collection and assessment process 200 described herein will be discussed relative to the GUIs shown in FIGS. 6-8B and the components of the data collection and assessment system 10. However, it will be appreciated that any system can be used to perform the process 200 so long as the system is capable of using conditional statements to customize the data collection and assessment processes performed thereby to each specific user of the system. In addition, it will be understood that the GUIs displayed in FIGS. 6-8B are merely offered by way of non-limiting, explanatory examples and that any type of user-facing presentation layer can be used. Furthermore, while the GUIs displayed in FIGS. 6-8B are tailored to use of the data collection and assessment system 10 in connection with a cardiac risk assessment, it will be understood that the data collection and assessment system 10 may be configured and/or the data collection assessment process 200 may be performed to provide interactive inquiries and produce customized results in any industry. Accordingly, the system 10 and process 200 are not limited by way of the explanatory examples provided herein and the system 10 and process 200 can be applied to any service or industry where an automated system capable of delivering personalized experience and information to the user is desired.

Figure 6:
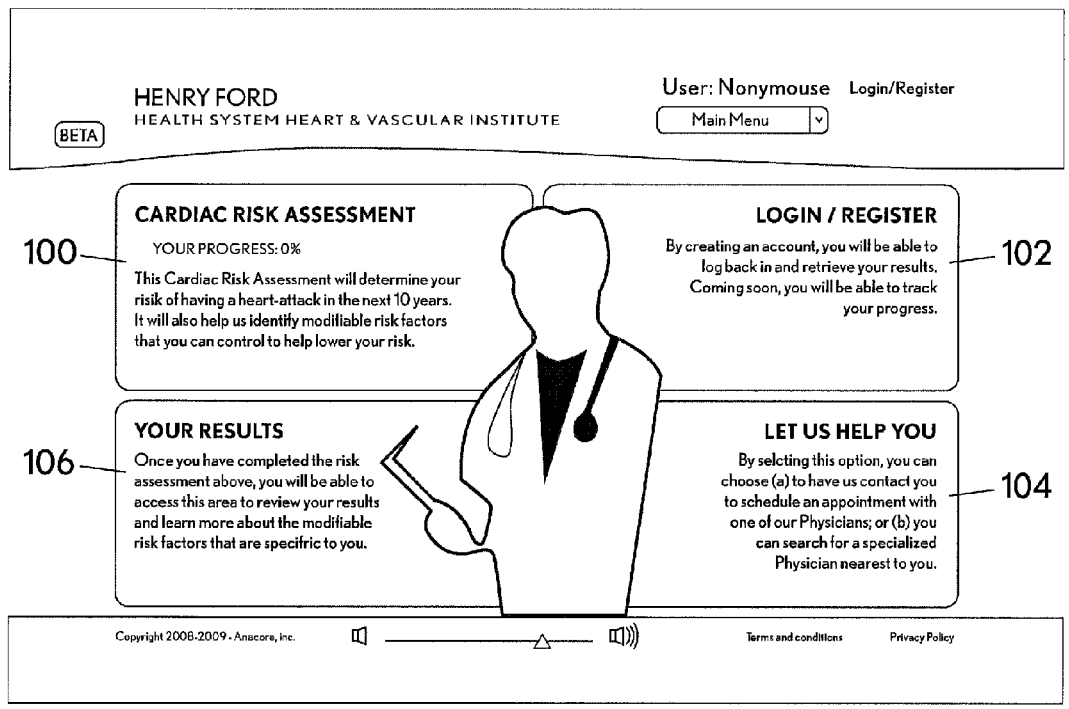
FIG. 6 shows one example of a graphic user interface for accessing the functionality of a data collection and assessment system.

Referring to FIG. 5, the data assessment and collection process 200 begins with a user selecting a particular module 30 of the data collection and assessment system 10 at step 202. As shown in FIG. 6, one example of a main menu presentation layer is shown that lists the available modules 100, 102, 104, 106 of the data collection and assessment system 10. In this at least one embodiment, a user may select the risk assessment module 100 labeled "Cardiac Risk Assessment," a registration module 102 labeled "Login/Register," a help module 104 labeled "Let Us Help You," or a result module 106 labeled "Your Results."

In addition to the text information provided to the user via the GUI 300, an audio and video component 108 may additionally be included in selected steps of the module 30. In this at least one embodiment, the audio and video component 108 comprises a video image of a physician and an associated audio stream. This audio and video component 108 may be configured to play continuously while the user is engaged with this GUI 300 and may be scripted to provide relevant information to the user. For example, the specific audio and video component 108 shown in FIG. 6 may be scripted to discuss the various functionalities of the different modules 100, 102, 104, 106 and/or provide an introductory description of the data collection and assessment system 10 to the user. It will be appreciated that different audio and video components 108 may be associated with the different steps of the module (s) 30 and thus may be scripted to, among other things, provide information explaining certain user inquiries throughout the various steps of the module 30 and/or information regarding the user's overall assessment results as calculated by the system 10.

Figure 7:
FIG. 7 shows one example of a graphic user interface that may be related with a data collection-type or combination-type step of a risk assessment module.
Figure 7:

Now referring back to FIG. 5, after a user selects the desired module 30, at step 204 the selected module 30 advances to its first step which is retrieved from the server 12. According to the configuration and details associated with the first step of the selected module 30, the system 10 displays the appropriate GUI associated with the current step of the module 30 at step 206. FIG. 7 illustrates at least one example of a GUI 500 that may be related with a data collection-type or combination-type step of the risk assessment module 100.

At step 208, the core application logic of the system 10 assess whether or not the current step of the module 30 requires a user response. In the event the step of the module 30 comprises simply an informative-type step where no user response is required, the data collection and assessment process 200 advances to step 210. However, if at step 208 the step of the module 30 necessitates a response from the user, the user is prompted to enter a response value. Upon the user's entry of the same, the response value is sent to the server 12 to be saved on at least one of the databases 40 associated therewith.

When saving the response value, at step 209 the server 12 first verifies whether or not the current step has been assigned to a specific user-metric. If the response value of the current step has been assigned to a user-metric, the response value is saved under the appropriate user-metric in the user-metric records associated with the user's account. However, in at least one embodiment of the process 200, regardless of whether the response value collected in the module step has a user-metric assigned, the response value is stored under the user's account for that particular step.

In the event the data collection and assessment system 10 comprises a custom business logic application, the integration of the same may be triggered at step 209*a*. For example, in the event a user has responded in a desired manner to a particular response request or series of response requests provided by the module 30, the custom business logic application may interface with a desired third-party application at step 209a and take customized action based on the user's response. As with the other components of the data collection and assessment system 10, such customized actions may be defined by an administrator. After these customized actions are complete, the process 200 returns to step 209 and saves any data/response obtained from the third party application in connection with the user's account.

After the response value has been saved (or if no response value was required at step 208), the network server 12 retrieves the next appropriate step of the module 30 for the user at step 210. To determine which step in the module 30 sequence is appropriate to next present, the system 10 systematically looks for and evaluates any condition that might apply to the applicable steps.

At step 212, the module 30 identifies whether or not the next step of the module 30 has been assigned a conditional statement. If the next step of the module 30 is not associated with a conditional statement, the module 30 simply proceeds to that next step and the process 200 reverts to step 206. However, if the next step of the module 30 has been assigned a condition, the process 200 proceeds to step 214.

As previously noted, in the event the next step in the sequence of the module 30 is not associated with a conditional statement, the process 200 reverts to step 206 and the next step of the module 30 is triggered. In the event the next step in the sequence is an informative-type step, a data collection-type step, or a combination-type step, the appropriate GUI associated with the next appropriate step of the module 30 will be displayed to the user. However, if the next step in the sequence is a calculation-type step, the step may be invisible to the user as it occurs behind the scenes.

Where the next appropriate step of a module 30 comprises a calculation-type step, the network server 12 inserts the appropriate user-metrics into the formula(e) associated with the step and executes the formula(e), thereby producing a result user-metric. Thereafter, the result user-metric is saved to the network server 12 and, as the calculation-type step does not capture a response value from the user at step 208, the process 200 proceeds to step 210 where the network server 12 retrieves the next appropriate step of the module 30 for the user. Because calculation-type steps may be invisible to the user, in the event one or more of the steps of a module 30 are of the calculation-type variety, the user may be unaware that these steps are being performed as, visually, the module 30 simply advances to the next appropriate sequential step that displays a GUI.

As previously noted, at step 212 the module 30 identifies whether or not the next step of the module 30 has been assigned a conditional statement. If at step 212, the next step of the module 30 has been assigned a condition, the process 200 proceeds to step 214. At step 214, the system 10 retrieves the condition formula(e) from the step of the module 30. Thereafter, at step 216, if the condition contains user-metrics, the user-metrics are inserted into the condition string and the formula is evaluated. In at least one embodiment of the process 200, the system 10 uses a custom logic evaluator to determine the Boolean value of the condition defined for the step of the module 30. If, at step 218, the step passes its Boolean evaluation (i.e. the conditional formula is true), the step is presented to the user as the next step of the module 30 and the process 200 reverts to step 206 of the process 200. In the event the condition fails (i.e. the conditional formula is false), the process 200 returns to step 210 and the next step of the module 30 is evaluated as previously described for presentation to the user.

The steps of the process 200 continue to cycle as described herein until all of the steps of the module 30 have either been presented to the user or evaluated by the module 30 and deemed not to apply. Accordingly, when no further steps remain in the sequence of the module 30, the user is informed that the module 30 has been completed and any the results of the process 200 are provided to the user.

Figure 8A:
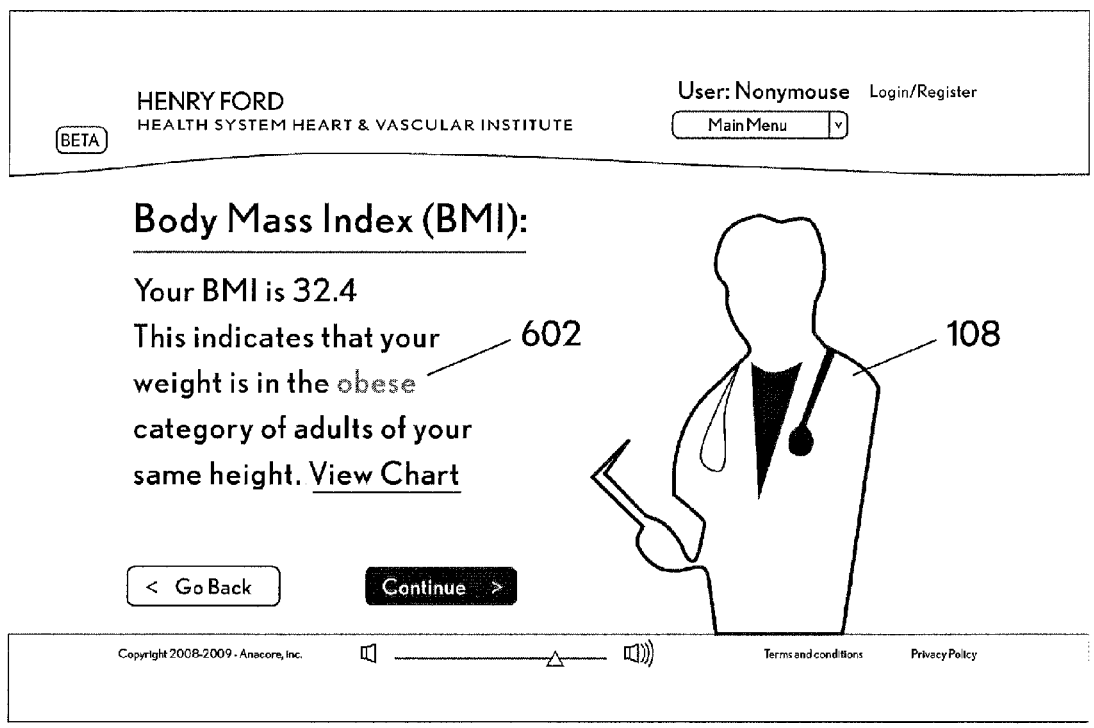
FIGS. 8A and 8B show examples of graphic user interfaces for displaying the results of a data collection and assessment process.
Figure 8B:
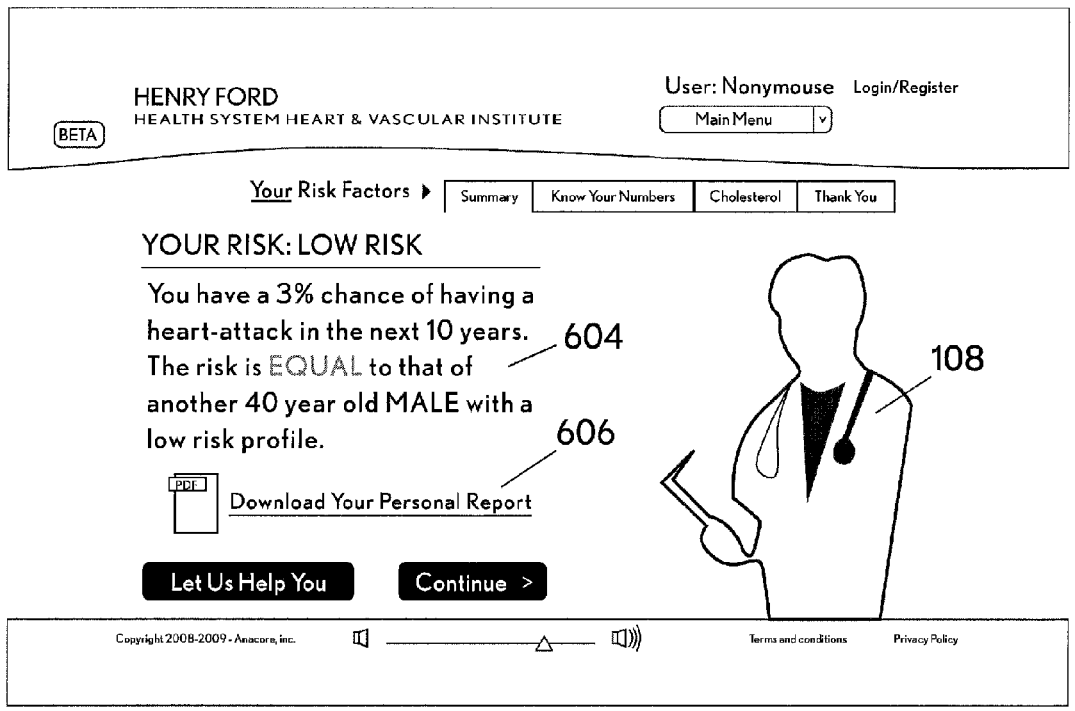

Now referring to FIGS. 8A and 8B, two front-end GUIs are shown, both of which display the results calculated as a result of the data collection and assessment process 200. FIG. 8A shows a GUI 600 comprising an audio and video component 108 for providing an auditory and visual explanation of the Body Mass Index and the user's results and a result component 602 for providing a solely visual representation of the results calculated through the performance of the process 200. It will be appreciated that, in at least one embodiment, the script associated with the audio and video component 108 correlates with and expands upon the data displayed by the result component 602. Likewise, FIG. 8B illustrates a GUI 700 also comprising an audio and video component 108. However, in addition to the audio and video component 108, the GUI 700 provides an overall conclusion as to the risk associated with the results displayed in the result component 602 of FIG. 8A. Furthermore, in this at least one embodiment, GUI 700 further provides a link 606 to a downloadable report that sets forth a summary of the results of the module 30 as well as the overall conclusion based thereon.

The administrator of the data collection and assessment system 10 may configure the modules 30 according to certain desired criteria. Specifically, an administrator of the data collection and assessment system 10 can create a description of a module 30, create and establish the steps of the module, define the available response(s) to each of those steps, incorporate various informative text and/or explanatory audio and video components 108 into the steps of the module 30, establish the conditions under which the steps will be presented to a user, and define the accepted format of user-metric values that will be recorded for each response. In this manner, the administrator of the risk assessment module 100 can gear the overall functionality of the risk assessment module 100 to particular applications and thereby provide a user with a personalized data assessment experience.

Figure 9:
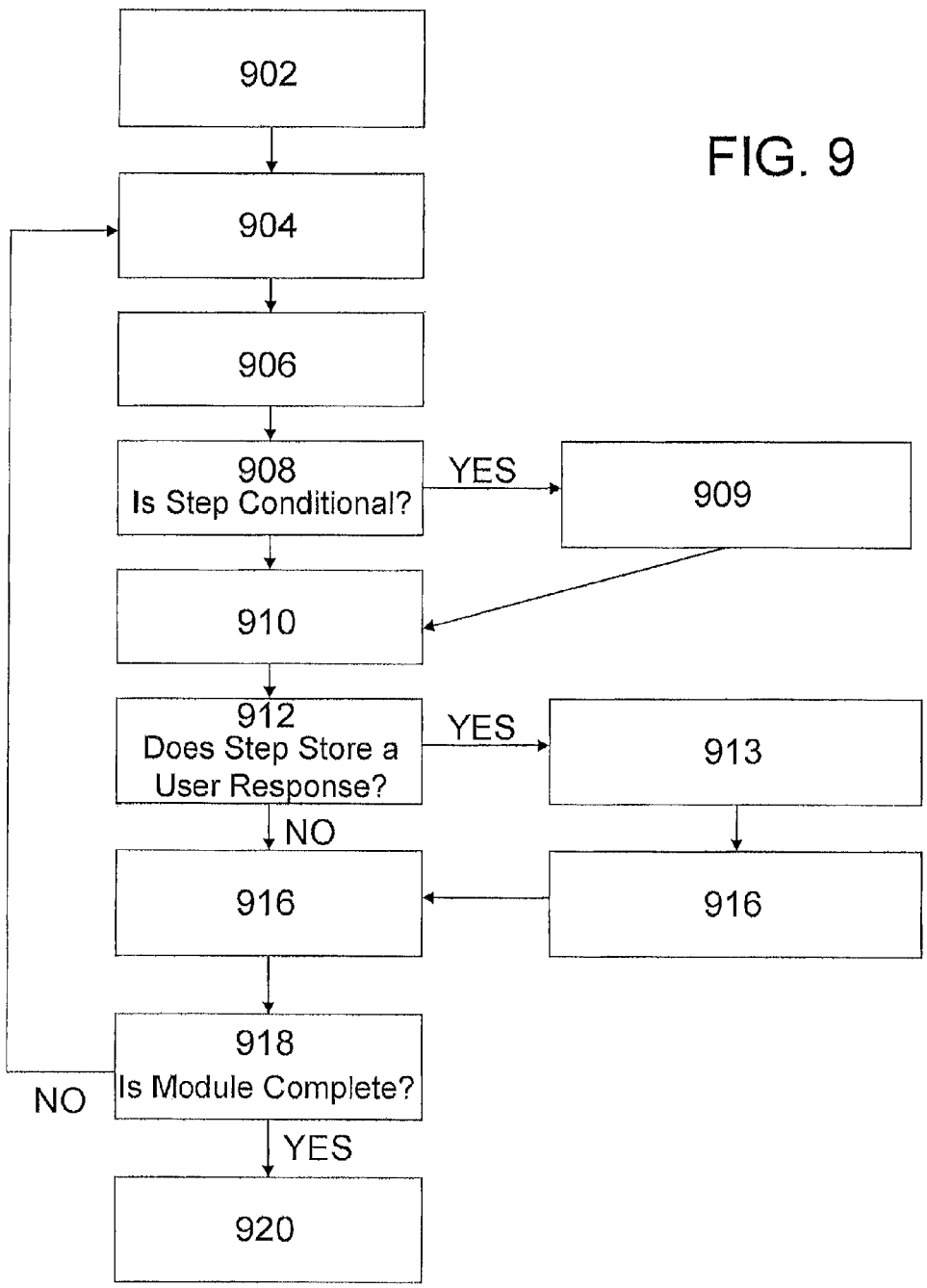
FIG. 9 shows a flow chart of one example of a module creation process.

Now referring to FIG. 9, a module creation process 900 is described as it relates to a module 30. The flow chart shown in FIG. 9 provides a summary or overview of the major steps of the module creation process 900; however, it will be understood that additional steps may also be included to fully customize the module 30 to the specific needs of an administrator of the data collection and assessment system 10. For ease of understanding, the steps of the module creation process 900 described herein will be discussed relative to the administration interface 1000 shown in FIGS. 10A and 10B and the components of the data collection and assessment system 10. It will be understood that the specific embodiments displayed in FIGS. 10A and 10B are merely offered by way of non-limiting, explanatory examples and that any type of presentation layer and/or set of fields can be used.

Referring to FIG. 9, the module creation process 900 begins with entering the module settings at step 902 into an administration interface. For example and without limitation, the administrator of the data collection and assessment system 10 may enter details with respect to a presenter of an audio and video component 108 incorporated into one or more of the steps of the module 30, a description of the module 30, and/or any appropriate notes. After the general structure of the module 30 has been formed, at step 904 the specific steps of the module 30 are created for prompting a user to enter specific data into the data collection and assessment system 10. Accordingly, if the administrator desires to use the module 30 as a cardiovascular risk assessment tool, then the administrator can create the various steps required to gather the requisite user-metrics that will enable the module 30 to provide a risk value and other desired results based upon the resulting assessment of the values of the user-metrics entered.

Figure 10A:
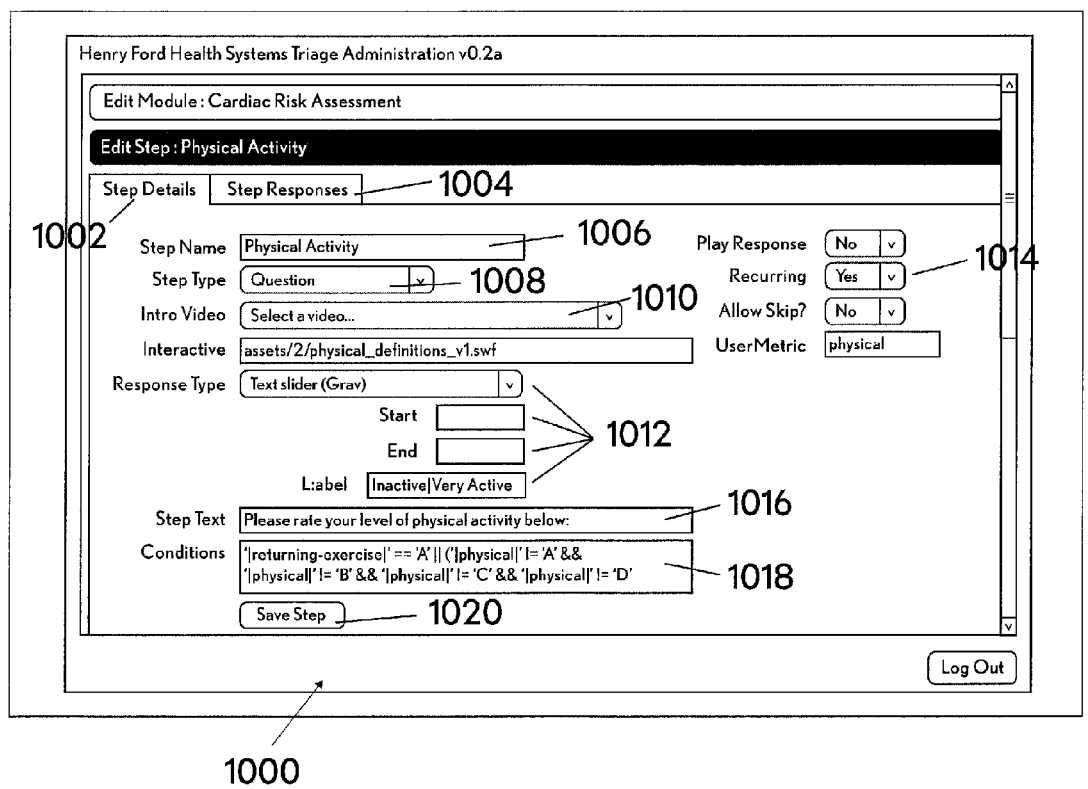

FIG. 10A illustrates at least one embodiment of an administration interface 1000 that is capable of assisting with the performance of the various steps of the module creation process 900. In this at least one embodiment, the administration interface 1000 provides a plurality of fields through which an administrator may define the objects under management (i.e. the description of the module 30 and the steps of the module 30). The administration interface 1000 of FIG. 10A may contain a first tab 1002 labeled "Step Details" and a second tab 1004 labeled "Step Responses." Further, the first and second tabs 1002, 1004 may each comprise a plurality of fields through which the administrator can create and/or define a step of the module 30.

At step 906, each step of the module 30 is further defined and formatted. For example, a step may be configured to provide explanatory information to the user regarding a particular inquiry and to prompt the user to provide a response in a particular format. Alternatively, the formula(e) associated with a calculation-type step may be entered. Accordingly, at step 906 each step of the module 30 can be customized to ensure the targeted data entered by the user will be accurate and complete.

Referring back to FIG. 10A, an administrator of the system 10 may use the Step Details tab 1002 to perform step 906 of the method 900. The Step Details tab 1002 generally comprises a list of specifications that are associated with a particular step of the module 30 and may include all of the information related to how that step will be presented to and interact with the user through the front-end, user-facing GUI. In addition, if it is desired that the step display an audio and video component 108, the relevant file name is selected from the drop down menu of field 1010 entitled "Intro Video." Furthermore, the details relating to the overall dynamics of the step's presentation to the user may be defined in fields 1014 and, if desired, an administrator can enter free-form text to be presented to the user at this step through the use of field 1016.

As previously described, one or more of the steps of the module 30 may be subject to a conditional statement such that these steps will only be presented to the user in the event they are deemed applicable based on the values of certain user-metrics previously collected from the user. Now referring back to FIG. 9, at step 908, it is determined whether or not the step at issue will be subject to a conditional statement. For those steps identified as not requiring conditional statements, the method 900 advances directly to step 910. However, in the event a step is identified as appropriate to associate with one or more conditional statements, the module creation process 900 advances to step 909 where a conditional statement is created and associated with the identified step.

Referring back to FIG. 10A, an administrator may use the administrative interface 1000 to associate a step of the module 30 with a conditional statement at step 909 of the method 900. As shown in FIG. 10A, a step may be associated with a conditional statement by entering the relevant conditional statement or algorithm into field 1018. Alternatively, in the embodiments where the data collection and assessment system 10 further comprises a knowledge base 50 stored within at least one or more databases 40 and/or an external database, the field 1018 may provide a link to the appropriate portion of the knowledge base 50 and/or external database such that the step is directed to the relevant component of the knowledge base 50/external database upon evaluating the user-metric values.

After the conditional statement is assigned to the step of the module 30, if applicable, the method 900 advances to step 910. At step 910, the administrator assigns a step type to each of the steps of the module 30. As previously described herein, each of the steps may comprise a data collection-type step, an informative-type step, a combination-type step or a calculation-type step. In at least one embodiment, an administrator may specify details as to how the step is presented to the user, or if a visual representation of the step is presented to the user (i.e. the step type), through use of the administrative interface 1000 by selecting the desired value from the drop-down menu in field 1008 entitled "Step Type."

Further, at step 912, the steps that solicit and store a user response value are identified. In the event a step does not store a user response (for example, the step is an informative-type step), the module creation process 900 advances to step 916. However, for those steps identified as requiring a response, at step 913 the user-metrics are selected and identified, which defines a field in at least one of the databases 40 of the system 10 under which the associated response value will be stored. Furthermore, at step 914 the totality of the acceptable responses for a given step are created and stored. As shown in FIGS. 10A and 10B, the type of response accepted and any limits placed on the response value at steps 913 and 914 of the method 900 may be defined in the fields 1012 located under the first tab 1002 entitled "Step Details" or through use of the fields 1022 located under the second tab 1004 entitled "Step Responses." After all responses for a given step have been created (or, as previously indicated, the step at issue does not store a user response), the method 900 proceeds to step 916.

At step 916, the administrator can preview the various parameters that have been associated with the step at issue and, if the same are sufficient, save the step into the sequence of the module 30. For example, in the at least one embodiment of the administrative interface 1000 shown in FIG. 10A, the administrator may simply select the activation button 1020 located under the fist tab 1002 entitled "Step Details." At step 918, it is determined whether or not all of the necessary steps of the module 30 have been created. If not, the method 900 reverts to step 904 and steps 904-918 are repeated until all of the steps of the module 30 have been created. After all steps in the module 30 have been created, the sequence in which the steps will be presented can be altered at step 920. In at least one embodiment, this is achieved by dragging and visually reordering the listing of steps of the module 30.

The devices and processes described herein have been presented in detail with reference to certain embodiments thereof; however, such embodiments are offered by way of non-limiting examples, as other versions are possible. For example, the data collection and assessment system 10 may comprise one or more modules 30 for use in connection with various service industries such as financial planning, vehicle sales and service locations, etc. In addition, one or more modules 30 of the data collection and assessment system 10 may be configured such that the system 10 performs as a virtual guidance counselor for use by students in their search for secondary education or related institutions. It is anticipated that a variety of other modifications and changes will be apparent to those having ordinary skill in the art and that such modifications and changes are intended to be encompassed within the spirit and scope of the devices and methods as defined by the following claims.

We claim:

1. A system for providing interactive data collection and assessment, the system comprising:
a memory, the memory storing at least one application and at least one module, each of the at least one modules defining two or more steps with at least one of the steps configured to collect data from a user through one or more graphical user interfaces;
a processor, the processor operable to execute the application to collect data from the user, to evaluate the collected data, derive one or more result values from the collected data, derive a customized sequence of each module comprising at least one step, the customized sequence being based at least in part on the one or more result values and at least one conditional statement at each step, and to execute each step of each module in the customized sequence;
a network interface, the network interface electronically coupled to the processor and at least one database; and
at least one device electronically coupled to the network interface configured to display the one or more graphic user interfaces associated with the at least one module of the application.

2. The system of claim 1 in which the at least one application is adapted to store the collected data in one or more of the at least one databases.

3. The system of claim 1 in which each step of the module is selected from the group consisting of a data collection-type step, an informative-type step, a calculation-type step, and a combination data collection-type and informative-type step.

4. The system of claim 1 in which at least one of the graphic user interfaces associated with the at least one module of the application comprises an audio and video component.

5. The system of claim 4 in which a first step of the module comprises an audio and video component comprising a first content, a second step of the module comprises an audio and video component comprising a second content, and the processor is operable to select between executing the first step and the second step based on the result value.

6. The system of claim 1 in which at least one of the modules comprises a decision logic.

7. The system of claim 1 in which one or more of the at least one databases comprises an external database electronically coupled to the network interface.

8. The system of claim 1 in which the at least one databases comprises a knowledge base comprising data benchmarks.

9. The system of claim 8 in which the application is adapted to evaluate the collected data against the data benchmarks of the knowledge base and present the result value to the user through the graphic user interface when executed by the processor.

10. The system of claim 1 in which one or more of the applications comprises a custom business logic application, wherein the processor is operable to execute the business logical application to analyze the collected data, interface with and retrieve third-party data related to the collected data from a third-party application or a third-party database, and integrate the third-party data into one or more steps of a module of the application.

11. The system of claim 10 in which the third-party data comprises an advertisement and at least one of the two or more steps of the module displays the advertisement to the user through the graphic user interface.

12. The system of claim 1 in which at least one of the modules is adapted to receive an inquiry from the user, categorize the inquiry according to pre-defined variables, and assign the inquiry to a resource associated with the identified category when executed by the processor.

13. A computerized method providing interactive data collection and health assessment, the method comprising:
collecting health data from a user through a dynamic graphical user interface, wherein the health data includes measured health parameters and lifestyle information;
storing the health data in a database;
deriving one or more result values from the health data with a processor; and
repeating at least one of the collecting, storing, and deriving steps based at least in part on the one or more result values according to a customized sequence;
wherein the one or more result values correspond to one or more risk factors associated with the user based at least in part on at least a portion of the health data.

14. The method of claim 13, further comprising:
identifying a contact information for at least one health care specialist based on the health data; and
presenting the contact information through the dynamic interface.

15. The method of claim 13, wherein the customized sequence includes one or more steps wherein each of the one or more steps is selected from the group consisting of a data collection-type step, an informative-type step, a calculation-type step, and a combination data collection-type and informative-type step.

* * * * *